US012202122B2

(12) United States Patent
Tulsidas

(10) Patent No.: US 12,202,122 B2
(45) Date of Patent: Jan. 21, 2025

(54) AUTONOMOUS DRIVE THROUGH SYSTEM AND A METHOD THEREOF

(71) Applicant: Techolution Consulting LLC, New York, NY (US)

(72) Inventor: Luv Tulsidas, New York, NY (US)

(73) Assignee: Techolution Consulting LLC, New York, NY (US)

( * ) Notice: Subject to any disclaimer, the term of this patent is extended or adjusted under 35 U.S.C. 154(b) by 275 days.

(21) Appl. No.: 17/969,381

(22) Filed: Oct. 19, 2022

(65) Prior Publication Data

US 2024/0131718 A1 Apr. 25, 2024
US 2024/0227196 A9 Jul. 11, 2024

(51) Int. Cl.
*B25J 11/00* (2006.01)
*B25J 9/16* (2006.01)

(52) U.S. Cl.
CPC .......... *B25J 11/0005* (2013.01); *B25J 9/163* (2013.01); *B25J 9/1664* (2013.01); *B25J 9/1679* (2013.01); *B25J 11/0045* (2013.01); *B25J 11/008* (2013.01)

(58) Field of Classification Search
None
See application file for complete search history.

(56) References Cited

U.S. PATENT DOCUMENTS

2019/0279181 A1* 9/2019 Kelly ...................... G07F 9/023
2022/0382504 A1* 12/2022 Cioarga ................... G06F 3/147

FOREIGN PATENT DOCUMENTS

KR 1020230153810 A * 11/2023 .......... B25J 11/0045

* cited by examiner

*Primary Examiner* — Khoi H Tran
*Assistant Examiner* — Bryant Tang
(74) *Attorney, Agent, or Firm* — Mestechkin Law Group P.C.

(57) ABSTRACT

The present application relates to an autonomous drive through system and method for autonomously detecting the position of the user's face in a vehicle and through AI and robotic technology, calibrating the height, distance, and direction/orientation (x, y, z axis) of the interface associated with the device, bringing the interface closer to the user. The user (driver) either through touch screen and/or voice AI and/or pairing with a mobile device can order and/or pay and/or withdraw cash without coming out of their vehicle(s). The system includes one or more sensors, such as a camera, that provides input for autonomously adjusting height of the device with respect to the user (driver) window. Based on the location of the car window, the device adjusts its position via moving horizontally (x-axis) based on the location of the driver's window and adjusts its position vertically along the y-axis to place itself at the eye level of the user. Further, the device adjusts its position along the z-axis moving closer to the user's face allowing the user to have an efficient and convenient interaction with the system.

11 Claims, 5 Drawing Sheets

AUTONOMOUS DRIVE THROUGH SYSTEM AND A METHOD THEREOF

TECHNICAL FIELD OF THE INVENTION

The present application generally relates to drive through systems and methods. Specifically, the application relates to an autonomous drive through system and method for servicing vehicular drive-thru customers having several applications including but not limited to food ordering/payment process and ATM transactions.

BACKGROUND OF THE INVENTION

A drive-through or drive-thru is a type of take-out service provided by a business that allows customers to purchase products without leaving their cars. Orders are generally placed using a microphone and picked up in person at the window.

Typically, the drive-thru lane includes an order station along the drive-thru lane that may be located remote from the restaurant building. At the order station, a customer places an order by communicating with an attendant, such as by microphone and speaker. The attendant is positioned within the restaurant at a payment window that is located along the drive-thru lane and remote from the order station.

As the order is received by the attendant, the attendant enters the order in point-of-sale equipment, such as an electronic cash register. After placing an order, the customer drives downstream to the payment window and pays the attendant for the order. The customer then is directed to a downstream pick-up window in the building to receive the customer's order from another attendant within the building.

The existing Drive Through Systems have several disadvantages. In the existing systems/devices, the users must manually position themselves to the elements outside of their vehicle to access and interact with the system.

For example, in most of the existing drive systems, such as food ordering systems, the user has to drive up to the payment window/counter and come out of his/her vehicle to order food as the microphone is not within the proximity of the user, make payment and thereafter collect food causing inconvenience. Also, in the current drive through systems, the user is unable to pair the device with his/her mobile device to make seamless payments.

Furthermore, in the existing drive through systems, such as Drive Through ATMs, users face difficulty in plugging their debit/credit card in the ATM machine and collecting the dispensed cash from said machine.

Due to the placement of the machine, the user is unable to reach the position of the dispenser and he/she needs to come out of their vehicle to collect the cash, thereby causing inconvenience to the user.

The current voice interaction is ineffective as the device such as a microphone is not within the optimum proximity of the user and unable to capture the voice of the user. The problem further increases due to various factors including but not limited to extreme outdoor weather conditions (for example rain, fog and others) and background noise in specific noise of vehicles passing by the user's vehicle.

Several attempts have been made to develop drive through systems, however these systems fail to provide an efficient real time voice and visual interface, wherein information, status and feedback between users is not interactive.

Due to the aforementioned drawbacks, there is a need to develop an intelligent and autonomous drive through systems and method for road legal vehicles that resolves the challenges faced by the existing drive through systems that are not fully automated, users must manually adjust their body positions (face and hand) to the screen and the microphone which are not within the proximity of the user to interact with, thereby causing inconvenience.

SUMMARY OF THE INVENTION

The present invention is directed towards an autonomous drive through system and method for road legal vehicles for autonomously detecting the position of the user's face in the vehicle and calibrating the height, distance and direction (x, y, z axis) of the device, bringing the edge device closer to the user.

In an embodiment of the present invention, the drive through system, comprises an edge device; sensors and/or camera device for autonomously detecting the position of the user's face in the vehicle, wherein the Edge device calibrates, y-axis (height), x-axis (alignment) & z-axis (distance); at least one motor placed in the system for facilitating the motion in all three axis of the edge device; a proprietary AI model that processes and computes the received input data from sensors and/or camera and renders an output decision to determine the position of the stopped vehicle and user's face in the vehicle; a voice AI subsystem having a voice AI model, a microphone connected with the main controller circuit to enable voice based interaction of the user with the edge device; and a display screen for real time interaction of the user with the edge device.

In another embodiment of the present invention, the user drives up to the system and upon reaching the system the device moves itself to a ready to order position as close as possible to the face of the user sitting inside the vehicle.

While the invention has been described and shown with particular reference to the preferred embodiment, it will be apparent that variations might be possible that would fall within the scope of the present invention.

BRIEF DESCRIPTION OF THE DRAWINGS

The foregoing summary, as well as the following detailed description of various embodiments, is better understood when read in conjunction with the drawings provided herein. For the purposes of illustration, the drawings disclose subject matter which is not limited to the specific methods and instrumentalities disclosed. Further, the advantages and features of the present disclosure will better understood with reference to the following detailed description and claims taken in conjunction with the accompanying drawing, wherein like elements are identified with like symbols, and in which:

DETAILED DESCRIPTION OF THE INVENTION

The following description includes the preferred best mode of one embodiment of the present invention. It will be clear from this description that the invention is not limited to these illustrated embodiments but that the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In any embodiment described herein, the open-ended terms "comprising," "comprises," and the like (which are synonymous with "including," "having" and "characterized by") may be replaced by the respective partially closed phrases "consisting essentially of," consists essentially of," and the like or the respective closed phrases "consisting of," "consists of, the like.

As used herein, the singular forms "a," "an," and "the" designate both the singular and the plural, unless expressly stated to designate the singular only.

Further, the use of terms "first", "second", and "third", and the like, herein do not denote any order, quantity, or importance, but rather are used to distinguish one element from another.

The present application relates to an autonomous drive through system and method for autonomously detecting the position of the user's face in road legal vehicles for and through AI and robotic technology calibrating the height, distance, and/or direction/orientation (x, y, z axis) of the device, bringing the display of the edge device 402 closer to the user. The user (driver) either through touch screen 404 and/or voice AI (artificial intelligence) and/or pairing with a mobile device can order and/or pay and/or withdraw cash without coming out of their vehicle(s).

Figure 1:
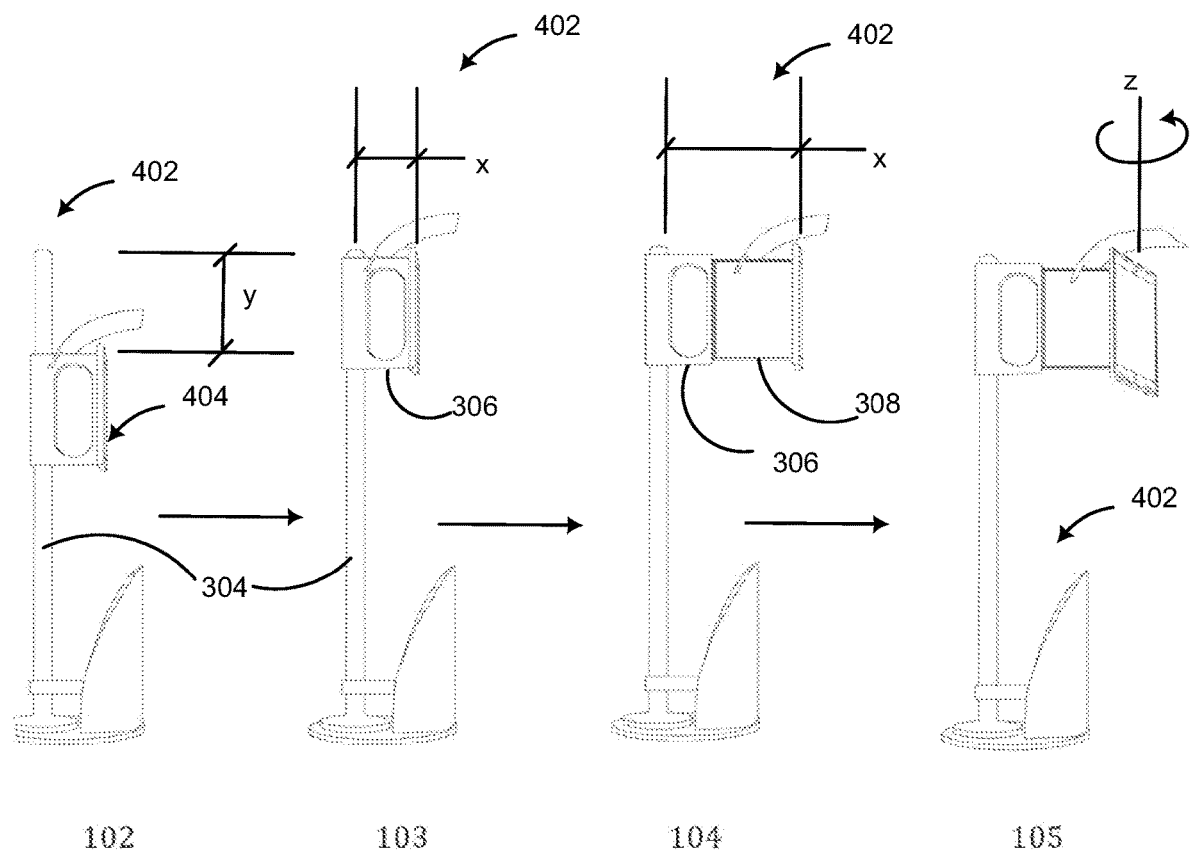
FIG. 1 illustrates the calibration mechanism of x, y, z axis of the device.

FIG. 1 illustrates different calibration positions of the device, wherein 102 is a first or home position (that is, the height-y is in a lowered position, the distance x from the central axis-y is minimized, and the orientation-z about the central axis-y of the display 404 is essentially orthogonal to the arms 306, 308 extending outward from the central axis of the tubular member 304), 103 illustrates y-axis calibration (that is, the display 404 is moved to a higher/highest elevation), 104 illustrates x-axis calibration (that is, the extending arm(s) 306, 308 are extended outward further/furthest), and 105 is z-axis calibration (that is, the orientation of the display 404 is pivoted so that it is essentially facing with the vehicle window/driver). With respect to 102-105, the display 404 is moved so that the person's face is essentially lined up with the display 404, vertically and horizontally.

Figure 2:
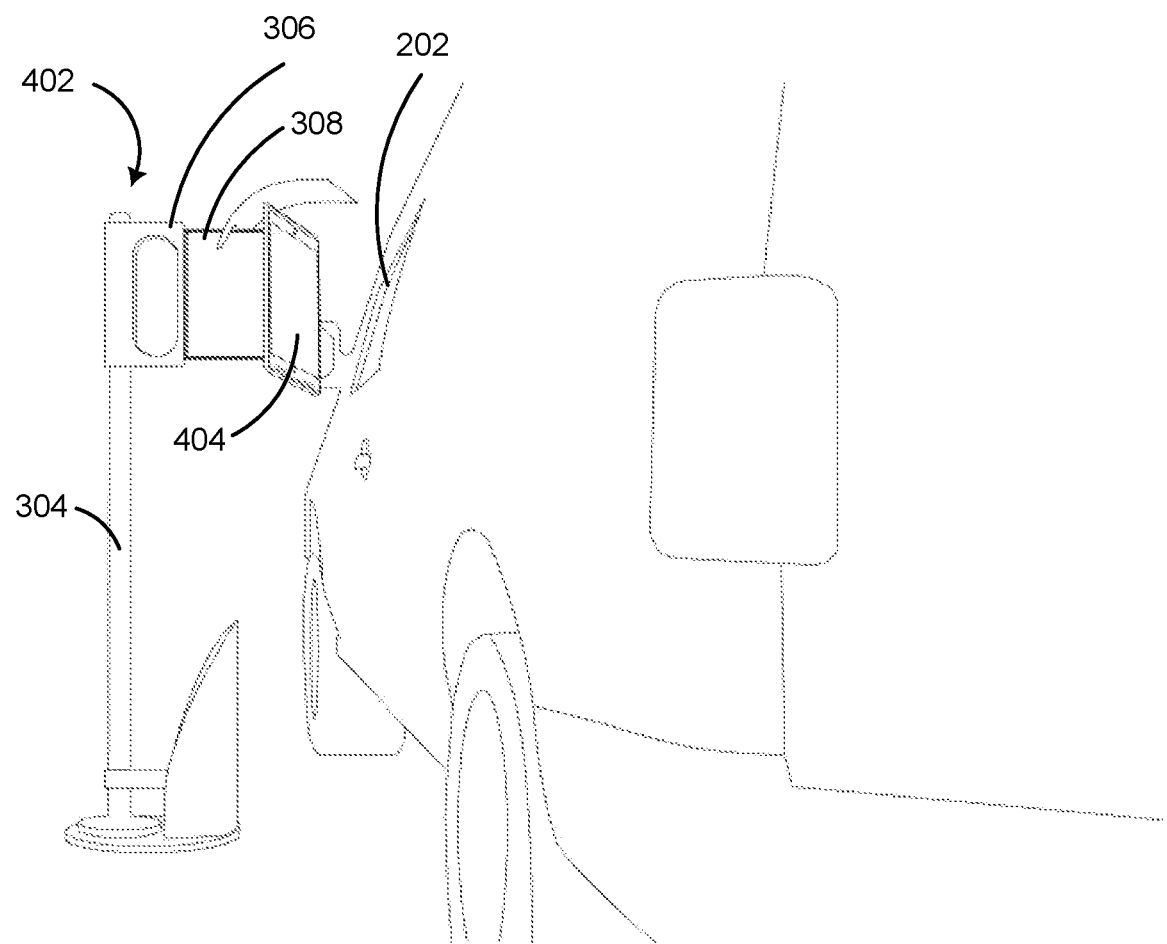
FIG. 2 illustrates the autonomous position detection mechanism of the user in the drive through system.

With the assistance of the system, the user drives up to the system and upon reaching the device 402, the device 402 autonomously moves itself/display 404 to a ready to order position, as close as possible to the face of the user sitting inside the vehicle 202, as shown in FIG. 2. That is, the system may locate the display screen 404 from the home position 101, in which the device is fully retracted or a farther/farthest position away from the vehicle in terms of x, y, z positions, to a second position closer to the driver of the vehicle, as discussed below and as illustrated in FIGS. 1 and 2.

The proposed system is triggered when a vehicle 202 enters the drive through area and moves towards the edge device 402. That is, the system may include a sensor or sensors (such as one or more cameras) that determine the location of the vehicle 202 relative to the device 402. The sensor may be part of the device 402 or an external sensor that communicates the vehicle position information to the device 402. The system may further determine whether the vehicle 202 has come within a certain proximity to the device 402 and to a complete stop. This may be accomplished via the camera associated with the display, which captures successive images of the vehicle 202. If the successive images are compared and found to be essentially the same, the system may interpret this information as the vehicle 202 having stopped. With respect to proximity, the system may determine whether the images contain a user's face and if the face is within a predefined central area of the image, the system may conclude that the user/vehicle is within the necessary proximity. If the user's face is to the left or right of the predefined central area, the system may generate voice prompts for the user to move the vehicle front or back. This loop may be repeated until the vehicle is sufficiently close to the device so that the device can extend toward the driver, as discussed herein. If the system via the sensor(s) determines that the driver of the vehicle is within a certain proximity to the device 402 and/or the screen 404, and/or is stopped, the system may then initiate movement of the display 404 toward the vehicle 202 and preferably toward the driver/user, as illustrated in FIGS. 1-2.

Referring to FIG. 2, wherein the autonomous movement feature of the y, z and x axis, adjusts the height of the display 404 according to the window(s) of the vehicle/face of the user and then approaches closer towards the window of the vehicle (preferably the driver's side window) and changes the direction/orientation to position the edge device 402 closer to the user's face 201. The above solution resolves the problem faced by users that must manually position themselves to fixed drive through elements outside of their vehicle to access and interact with the system.

Preferably, users' interface with an advanced high performance and accurate voice AI based interaction module. That is, the AI module includes a machine learning model that is trained to, inter alia, recognize the location of a vehicle's window, preferably the driver's window and/or the driver's face, and/or to recognize the driver's voice commands for autonomous interaction with the system.

Figure 5:
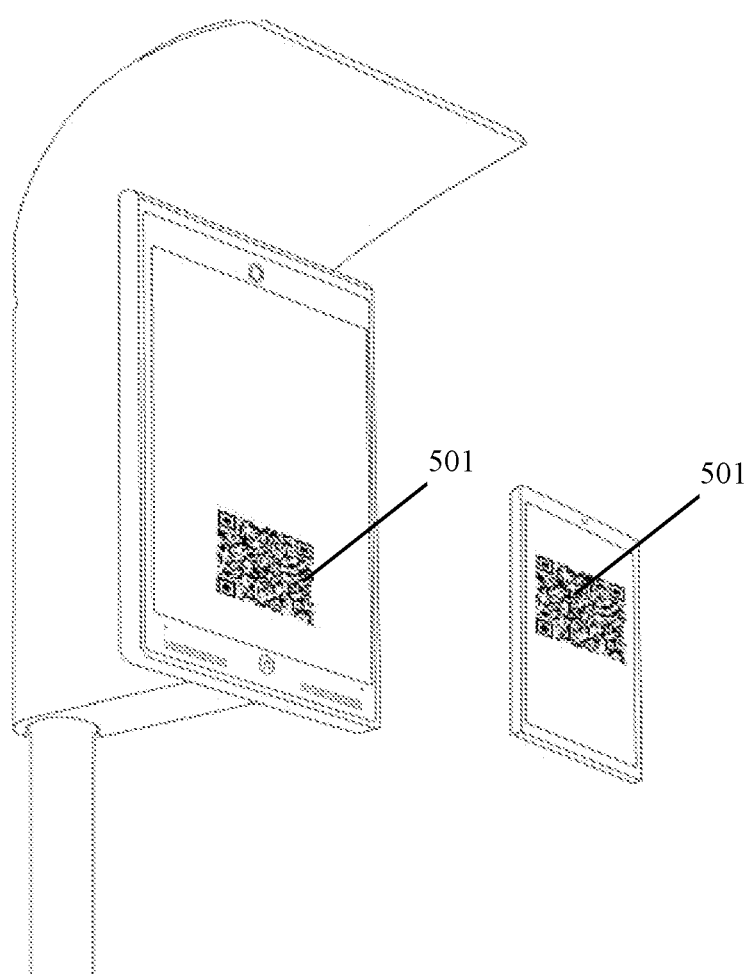
FIG. 5 illustrates the QR based pairing and/or interaction of the drive through system.

The interaction between the users and edge device 402 may be pursued in different ways including but not limited to QR code (FIG. 5, 501), Touch Screen, voice, gestures, etc.

With the help of the Intuitive and Interactive touch screen with UI (user interface) that can operate in all outdoor conditions working in synchronization with voice AI.

The system is adaptable to the new changes and/or unseen data along with continuous AI model evolution and/or improved performance and adaptability to new inputs.

The Automatic Feedback loop system captures, processes and transfers camera and/or sensor data/audio data along with the AI model output decision to the cloud and downloading firmware which facilitates transfer of data (software or AI model update) from the cloud to the edge device.

Figure 3:
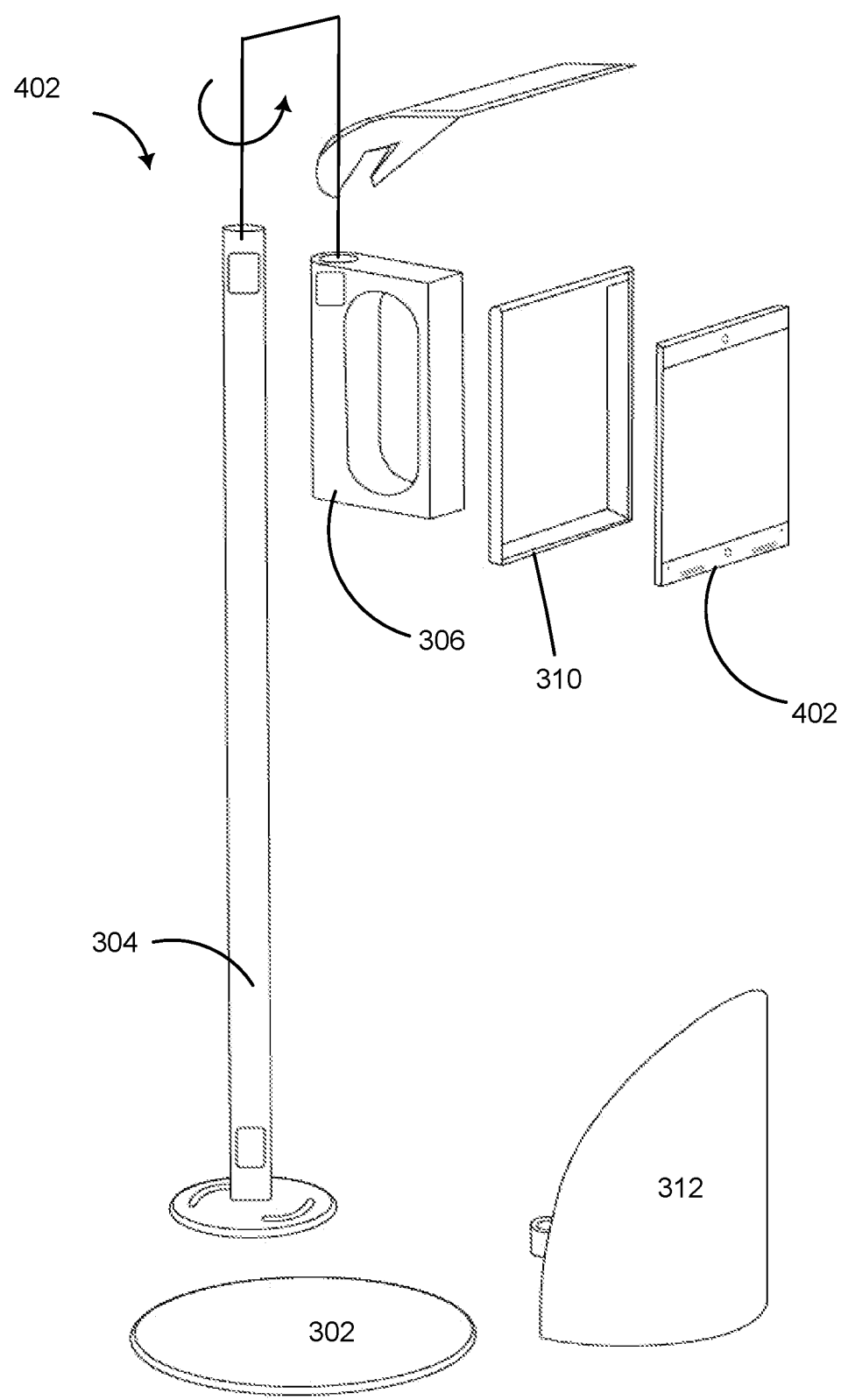
FIG. 3 illustrates the exploded view of the drive through system.

Referring to FIG. 3 illustrates the exploded view of the edge device 402, wherein the autonomous drive through system, comprises of an edge device 402; an array of external input peripherals including but not limited to sensors and/or camera device for autonomously detecting the position of the user's face in the vehicle, wherein the edge device calibrates, y-axis (height), x-axis (alignment) & z-axis (distance); at least one motor placed in the system for facilitating the motion in all three axis of the edge device and an external power supply.

In one embodiment, the edge device 402 includes a base 302 with a tubular structure 304 extending upward from the base 302. Movably attached to the base/tubular structure is a first arm 306, which is preferably configured to move vertically and autonomously on the tubular structure 304. In one embodiment, the first arm 306 includes a tubular recess that receives the tubular member 304 in a sliding engagement, as shown. This aspect enables the system to adjust the elevation-y of the display 402 to accommodate various vehicle heights. The first arm 306 is preferably also rotatable about the central axis of the tubular structure 304, so that the left-right orientation of the display 402 may be adjusted, also autonomously. A second arm 308 may be pivotally or telescopically attached to the distal end of the first arm 306, allowing the display 310 to be moved outward relative to the central axis of the tubular structure, as illustrated in FIG. 1. Finally, a housing 310 that receives the display 310 (as a unit) may be pivotally attached to the first and/or second arms, such that the display 402 may be oriented to tilt left/right and up/down. A curb cap 312 may be included at the base 302 of the device 402 to prevent vehicle intrusion onto the base of the device.

Figure 4:
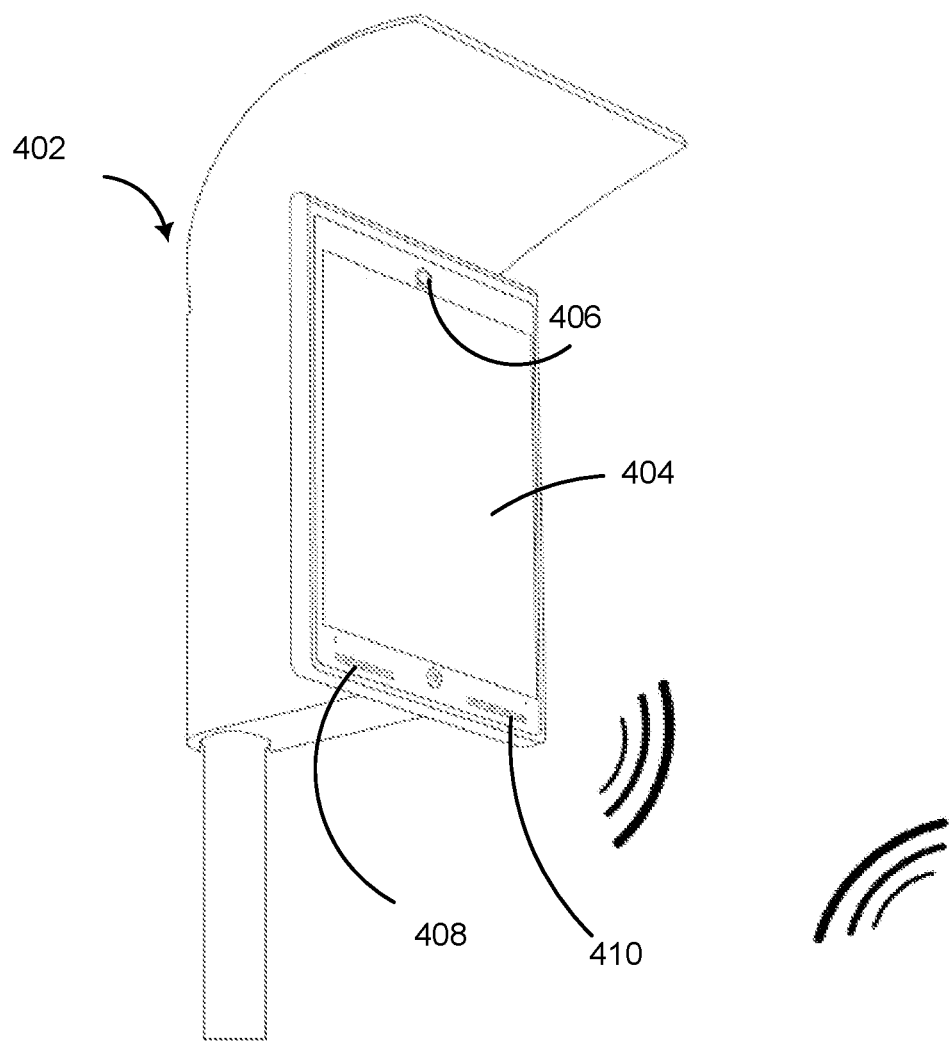
FIG. 4 illustrates the voice based AI interaction of the drive through system.

The system and/or the edge device 402 further includes a proprietary AI model loaded on the processor, wherein the model processes and computes the received input data from sensors 406, such as a camera, and renders an output decision to determine the position of the stopped vehicle and the user's face in the vehicle intending to utilize the system for a drive-thru order; a voice AI subsystem as illustrated in FIG. 4, wherein the subsystem consists of a voice AI model, at least one microphone 408 and/or speaker 410 connected with the main controller circuit to enable voice based interaction of the user with the edge device 402; and a display screen 404, wherein the screen enables real time interaction of the user with the edge device 402, including but not limited to interaction via user's touch. The device 402 may be a standalone device, which performs all of the functions discussed herein, or in communication with a remote server that shares the responsibility for the functions. For example, the device 402 may be wirelessly coupled to a server and/or point of service terminal within the establishment. In this regard, the sensors may capture data, such as images, and communicate those images to the server/POS terminal, which will determine via the AI model proximity of the vehicle/user. The system may then communicate with the device 102, including providing instructions for moving the display 402, as discussed herein.

There may be a System on Module (SOM) embedded with a processor and interfaced with wireless network protocols and/or cellular network technology; the wireless network protocol and/or cellular network technology connected to the server, wherein the protocol enables uploading of data by transferring field ground data from the system to the server and downloading firmware which facilitates transfer of data (software or AI model update) from the cloud to the edge device which establishes an automatic feedback loop system.

The system leverages sensor data with proprietary AI model to intelligently predict the position of the user in the vehicle intending to place an order and AI interacts with the robotics to move the device as close to the user's face as possible allowing efficient interaction between the user and the device through different ways, including but not limited to voice, touch screen, and the user's mobile device.

The system can be applied for several applications including but not limited to food ordering/payment process and ATM transactions.

Case 1

In a drive through product/food systems the user places the order at a drive through food store (i.e., fast food restaurant) using touch screen and/or voice AI subsystem and thereafter makes the payment by tapping/swiping their card.

The user has the option to pair their mobile device with the drive through ordering system when they are in direct line of sight within a limited distance, i.e., up to three feet from the edge device.

Further, the user has the option to pair their mobile device with the drive through ordering system when they are in direct line of sight within a limited distance, i.e., up to three feet of the edge device.

The system allows the user to place and pay for the order using their mobile device in their vehicle without having to open their window in case of bad weather conditions without losing their spot in the drive-thru lane.

Once the process of placing the order is executed, an optional add-on robotic dispensing system will stretch out as close to the vehicle window to autonomously deliver the product/food within comfortable reach of the user.

Case 2

In case of drive through ATMs, firstly the user(s) authenticates themselves by entering credentials (account login details) and places a request to withdraw a predefined amount of money at the drive through ATMs using touch screen and/or voice AI subsystem.

Once the process of placing a withdrawal request is completed, the robotic dispensing system will stretch out and dispense the requested money at an optimum position to the user sitting in the vehicle via the robotic dispensing mechanism.

The robotic mechanical system may be installed at a separate location down the drive-through lane for stores that have service windows, wherein the robotic dispensing mechanism senses the user approaching the window and stretches out as close to the user's window to autonomously serve the food.

The cloud platform here may be referred to as a cloud or a physical server located in a remote location. The cloud platform includes a plurality of computing devices that are distributed over a plurality of geographical areas. The cloud platform is configured to function as a server and database that stores user information, etc.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub combinations of the various features described herein above as well as variations and modifications thereof, which would occur to persons skilled in the art upon reading the foregoing description.

The invention claimed is:

1. An autonomous drive through system, comprising;
   an edge device;
   at least one sensor for autonomously detecting a position of a user's face in a vehicle, wherein the edge device calibrates y-axis (height), x-axis (alignment), and z-axis (distance);
   at least one motor placed in the system for facilitating the motion of the edge device in the x, y, and z axis;

wherein the edge device comprises;
    a AI model loaded on the processor, wherein the AI model processes and computes received input data from the one or more sensors and renders an output decision to determine a position of a stopped vehicle and the user's face in the vehicle;
    a voice AI subsystem, wherein the subsystem includes a voice AI model, at least one microphone connected with a main controller circuit to enable voice based interaction of the user with the edge device; and
    a display screen, wherein the screen enables real time interaction of the user with the edge device, including interaction via user's touch
a System on Module (SOM) embedded with a processor and interfaced with wireless network protocols or cellular network technology;
the wireless network protocol or cellular network technology connected to a server, wherein the protocol enables uploading of data by transferring field ground data from the system to the server; and
a power supply.

2. The system of claim 1, wherein the edge device configured to, upon a vehicle reaching the edge device, moves the display to a ready to order position as close as possible to the face of the user in the vehicle.

3. The system of claim 1, wherein the edge device is applied to drive through food systems and drive through ATMs.

4. The system of claim 1, wherein the edge device includes a base with a tubular structure extending upward from the base, and a first bracket attached to the tubular structure and configured to move vertically and autonomously on the tubular structure and pivot about an axis of the tubular structure, wherein the display is connected to a distal end of the first bracket.

5. The system of claim 4, wherein the edge device includes a second bracket pivotally attached to the distal end of a first bracket, allowing the display to telescope outward from the axis of the tubular structure.

6. The system of claim 1, wherein the user has the option to pair their mobile device with the drive through ordering system when they are in direct line of sight within a limited distance.

7. The system of claim 1, wherein the system allows the user to place and pay for the order using their mobile device in their vehicle without having to open their window in case of bad weather conditions without losing their spot in the drive-thru lane.

8. The system of claim 1, wherein the system leverages sensor data with the AI model to intelligently predict a position of the user in the vehicle and AI interacts with robotics to move the edge device as close to the user's face as possible, allowing efficient interaction between the user and the device.

9. The system of claim 1, wherein, in case of drive through product/food ordering systems, once a process of placing the order is executed, a robotic dispensing system stretches out as close to the vehicle window to autonomously deliver a product/food within comfortable reach of the user.

10. The system of claim 9, wherein the robotic mechanical system is installed at a separate location down the drive-through lane for stores that have service windows, wherein the robotic dispensing mechanism senses the user approaching the window and stretches out as close to the user's window to autonomously serve the food.

11. The system of claim 1, wherein in case of drive through ATMs, once a process of placing withdrawal request is completed, a robotic dispensing system stretches out and dispenses requested money at an optimum position to the user sitting in the vehicle via the robotic dispensing mechanism.

* * * * *